United States Patent [19]
Rodriguez et al.

[11] Patent Number: 5,353,061
[45] Date of Patent: Oct. 4, 1994

[54] SYSTEM AND METHOD FOR FRAME-DIFFERENCING VIDEO COMPRESSION/DECOMPRESSION USING PERCEPTUALLY-CONSTANT INFORMATION AND IMAGE ANALYSIS

[75] Inventors: Arturo A. Rodriguez, Boca Raton; Mark A. Pietras, Boynton Beach; Andres J. Saenz, Boca Raton, all of Fla.

[73] Assignee: International Business Machines Corporation, Armonk, N.Y.

[21] Appl. No.: 958,423

[22] Filed: Oct. 8, 1992

[51] Int. Cl.⁵ .............................................. H04N 7/137
[52] U.S. Cl. ..................................... 348/409; 348/386; 348/387
[58] Field of Search ................................ 358/13, 136; H04N 7/137, 11/04

[56] References Cited
U.S. PATENT DOCUMENTS

| | | | |
|---|---|---|---|
| 4,651,206 | 3/1987 | Ohki | 358/136 |
| 4,723,161 | 2/1988 | Koga | 358/136 |
| 4,785,349 | 11/1988 | Keith | 358/13 |
| 4,853,775 | 8/1989 | Rouvrais et al. | 358/105 |
| 4,857,993 | 8/1989 | Music | 358/13 |
| 4,942,465 | 7/1990 | Ohta | 358/133 |
| 4,969,040 | 11/1990 | Gharavi | 358/136 |
| 4,982,285 | 1/1991 | Sugiyama | 358/136 |
| 4,985,768 | 1/1991 | Sugiyama | 358/136 |
| 4,987,490 | 1/1991 | Ohta | 358/136 |
| 5,014,127 | 5/1991 | Richards | 358/13 |
| 5,079,630 | 1/1992 | Golin et al. | 358/133 |
| 5,218,431 | 6/1993 | Gleicher | 358/13 |
| 5,220,410 | 6/1993 | Wakeland | 358/13 |

*Primary Examiner*—Howard W. Britton
*Attorney, Agent, or Firm*—Paul W. O'Malley; Andrew J. Dillon

[57] ABSTRACT

A frame-differencing based method for coding and decoding color video data suitable for real-time, software-only based decompression and playback in low-end personal computers wherein the computational demands required of a computer microprocessor to implement the method are readily met by microprocessors such as an Intel 80386SX microprocessor running at 16 Mhz. Frame-to-frame differences are detected in a manner analogous to human perception of luminance data, rather than by the differences in the actual numerical video data. This permits greater compression of data without added computational complexity to the decompression process. Image analysis techniques are employed to ameliorate the appearance of the video. A lossless coding method that unifies two separate compressed data entities is used to obtain a greater amount of compression and simultaneously to reduce the computational complexity of the decompression process.

31 Claims, 10 Drawing Sheets

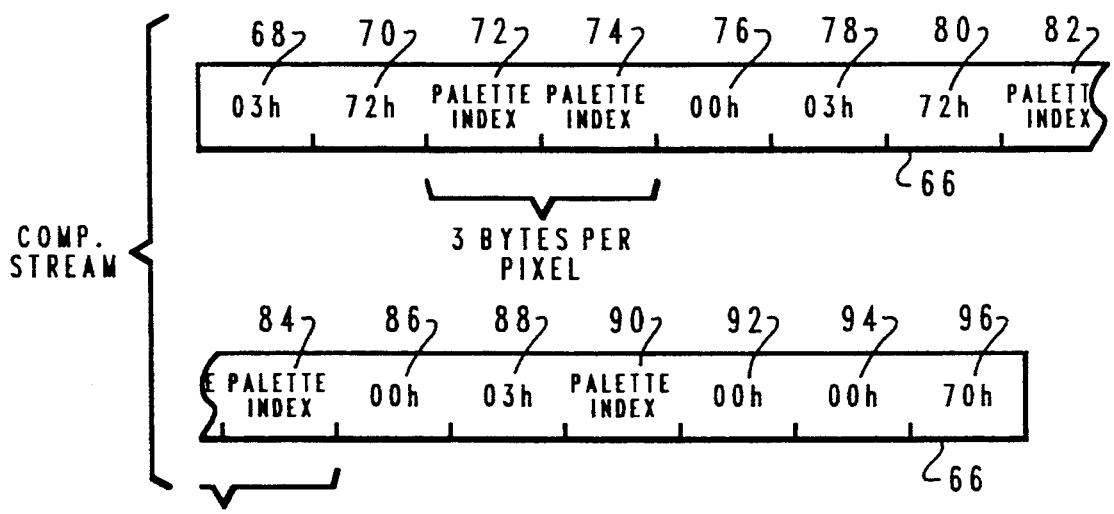

|   | 0 | 1 | 2 | 3 | 4 |
|---|---|---|---|---|---|
| 0 | — | — | — | COLOR BYTE | COLOR BYTE |
| 1 | — | — | — | COLOR BYTE | COLOR BYTE |
| 2 | — | — | — | COLOR BYTE | — |
| 3 | — | — | — | — | — |

SYSTEM AND METHOD FOR FRAME-DIFFERENCING VIDEO COMPRESSION/DECOMPRESSION USING PERCEPTUALLY-CONSTANT INFORMATION AND IMAGE ANALYSIS

BACKGROUND OF THE INVENTION

1. Technical Field:

The invention relates to the storage and playback in real-time of digitized video signals on a digital computer, and more particularly relates to a method of data compression and decompression that supports real-time reconstruction, and display of digitized video signals on a minimal personal computer system. Still more particularly, the invention relates to a method for real-time video decompression and playback with a computational load readily carried by the central processing unit (CPU) of low-end personal computers (e.g. a computer based upon an Intel 80386SX processor running at 16 mhz) without hardware modification of the computer.

2. Description of the Related Art:

A video signal is a sequence of images or frames, which are displayed at a given frame rate (e.g., 15 to 30 frames-per-second) to simulate the appearance of motion to a human observer. In a personal computer system, each frame of digitized video includes a digital representation of each pixel in the frame. A frame may have in excess of one half a million pixels. If full frames were replaced at a frame rate in excess of 15 frames-per second, a computer would be required to recover from storage and write to video memory over seven million bytes of data each second. Few current auxiliary data storage devices have the bandwidth required to pass such levels of data. Further, storage of only a few full frames of digitized video would fill most storage devices. In low-end personal computers, the CPU handles rewriting of the video memory buffer. Rewriting of the entire buffer every one fifteenth of a second would represent an excessive load on the CPU.

In a Red-Green-Blue (RGB) color video system, color values for each of the three color components may be specified for each pixel. One to three bytes (respectively 8-bit, 16-bit and 24-bit RGB) may be used to specify color for each pixel in the frame. Conversion charts from 16 and 24 bit RGB to 8-bit RGB exist and save processing and storage space. Further, conversion charts from 8, 16 or 24-bit color representations to an 8-bit index that is used as an address to a color lookup table (or palette) can also be performed. In compressed digital video, each value or byte is used as an address into a color lookup table or palette. Typically a palette contains 256 or fewer color values selected out of a set of $2^{24}$ colors. For instance, an RGB 784 palette specifies 7 levels of red, 8 of green and 4 of blue, for a total of 224 possible color values. Thus there are values that compressed and palettized color video data does not assume. The reserved values are typically used to provide gray scale tones for monochrome video systems.

Full frame storage and recovery is rarely, if ever, used for video playback on computer systems. Digital video generation on digital computers can be achieved by using frame differencing techniques to compress the data for storage and passage to and from storage. In general terms, frame differencing codes only such information that differs from one frame to the next. In reconstruction of a frame, the old frame residing in display memory is rewritten only to the extent changed. Since few of the pixels typically change from frame to frame, frame differencing techniques save considerable storage space and substantially reduce the bandwidth demands on auxiliary storage devices. However, such techniques require processor involvement to decompress video signal data to rewrite the changed portions of the frame. Typically, and in low end personal computers almost certainly, processor involvement takes the form of the CPU decompressing the data stream from the auxiliary storage device and writing the changed sections of the frame stored in the video buffer.

A frame compressed by a frame-differencing algorithm consists of two separate entities. One is a mechanism to denote the addresses (or locations) in the frame of the pixels that differed from the previous frame. The second entity denotes the values of the pixels that changed (i.e., the new information). A binary bit map has typically been used to mark the pixels of a frame which differed from the previous one and which did not differ. Such a map is an M×N array of "1's" and "0's" corresponding to the M×N array of pixels in a frame. The values of the pixels which changed then follow in a sequential list.

Data so compressed reduce the amount of consumed storage, thus allowing the video data to be stored in storage devices that have low sustained read rates such as compact disk read only memory (CD-ROM) and read/write (R/W) optical storage devices. The CPU burden of reading the video data from storage and writing it to the video buffer of display adaptors such as the Extended Graphics Array (XGA) and Super Video Graphics Array (SVGA) is also reduced. Frame-differencing video decompression algorithms can be implemented in low-end personal computers with addition of programming only, because they offer a reasonable amount of data compression while simultaneously providing a data format of low computational complexity for real-time decompression and display.

Frame to frame differences have been detected by comparison of the actual numerical values of corresponding pixels in each frame. While conceptually straightforward, the technique responds to changes from frame to frame which are beyond human perception, resulting in unnecessary demands on the computer's CPU. Literal frame to frame comparison of values of each pixel, without analysis of areas of pixels, results in a process that is susceptible to noise. For example, the RGB value for a pixel may be changed by electrical interference. The pixels adjacent to the changed pixel exhibit no change. Prior techniques would preserve the error and load the CPU with the time consuming task of writing the change to the display buffer.

Additional reduction in the amount of storage consumed by compressed data, the ability to store compressed video data in storage devices that have low bandwidths, and reduction in the computational load required of the central processor are all desirable.

SUMMARY OF THE INVENTION

It is therefore one object of the invention to provide an improved method of storage and playback in real-time of digital video signals on a digital computer.

It is another object of the invention to provide a method of data compression and decompression that supports real-time reconstruction and display of video signals on a minimal personal computer system.

It is yet another object of the invention to provide a software based method for video decompression and playback with a computational load readily carried by the central processing unit (CPU) of low-end personal computers.

The foregoing objects are achieved as is now described. The invention provides a system and method for evaluating the difference between pairs of frames in digital video data and for compressing and decompressing digital video data, where encoding of the compressed digital video data is efficient and lossless, and where decompression entails low computational complexity amenable to real-time decoding in basic personal computers without hardware modification of the computer. Image analysis techniques are employed in the compression algorithm to ameliorate the appearance of the video and increase the amount of the video compression. A lossless coding method efficiently unifies the two frame differencing data structures to obtain better compression and to simultaneously reduce the computational complexity of the decompression task.

A color video segment is recorded as a sequence of frames, each comprising an M×N array of pixel locations. Each pair of adjacent frames in the sequence is compared to generate an entry to an M×N bit map of differing pixels. The pixels at each corresponding location of the frames are compared utilizing a nonlinear luminance function using RGB values for the pixels at the location as the input variables. Luminance function range parameters are determined for each frame to frame comparison from the luminance range across the frames undergoing comparison. Occurrence of change in luminance between pixels at a corresponding pixel location depends upon the absolute value of any difference in luminance meeting a minimum threshold.

The M×N bit map is then filtered to remove isolated records of changed or unchanged pixels. Border regions of connected regions of changed pixels may be grown, eroded, or smoothed based upon luminance or color value changes of pixels in adjacent or nearby pixel locations.

A compressed data stream is generated by compressing each frame in the digital video in sequence. Each compressed frame is generated from the binary bit map and a sequential list of color values from the current frame occurring at locations in the frame corresponding to the locations marked in the binary bit map. Values unused for specification of color values are inserted in the compressed stream as special code words to specify decompression control information.

The special code words in the compressed data stream provide control information for updating a pointer to locations in an M×N decompression array of pixel locations. The pointer value is changed in response to placement of color value to a pixel location in the decompression array or in response to the control information.

The invention provides software-only video playback capabilities based upon frame-to-frame differences with an adaptive technique that simulates how humans perceive luminance data, rather than by the differences in the actual numerical video data. This technique has the advantage of providing greater data redundancy over traditional frame differencing algorithms without added computational complexity to the decompression and playback process, and without perceivable artifacts. The technique is adaptive to the information present in the two frames being compared and has a set of parameters the values of which can be selected to control the amount of compression.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 4A, 4B and 4C illustrate data structures used for digital video frame and the difference bit maps of two consecutive frames;

FIG. 6 illustrates a compressed data stream generated from a video signal;

FIG. 8 illustrates a data object for reconstruction of a decompressed frame.

DETAILED DESCRIPTION OF THE INVENTION

"OS/2" and "PS/2" are registered trademarks of International Business Machines Corporation in the United States. "80386SX" is a registered trademark of Intel Corporation in the United States.

Figure 1:
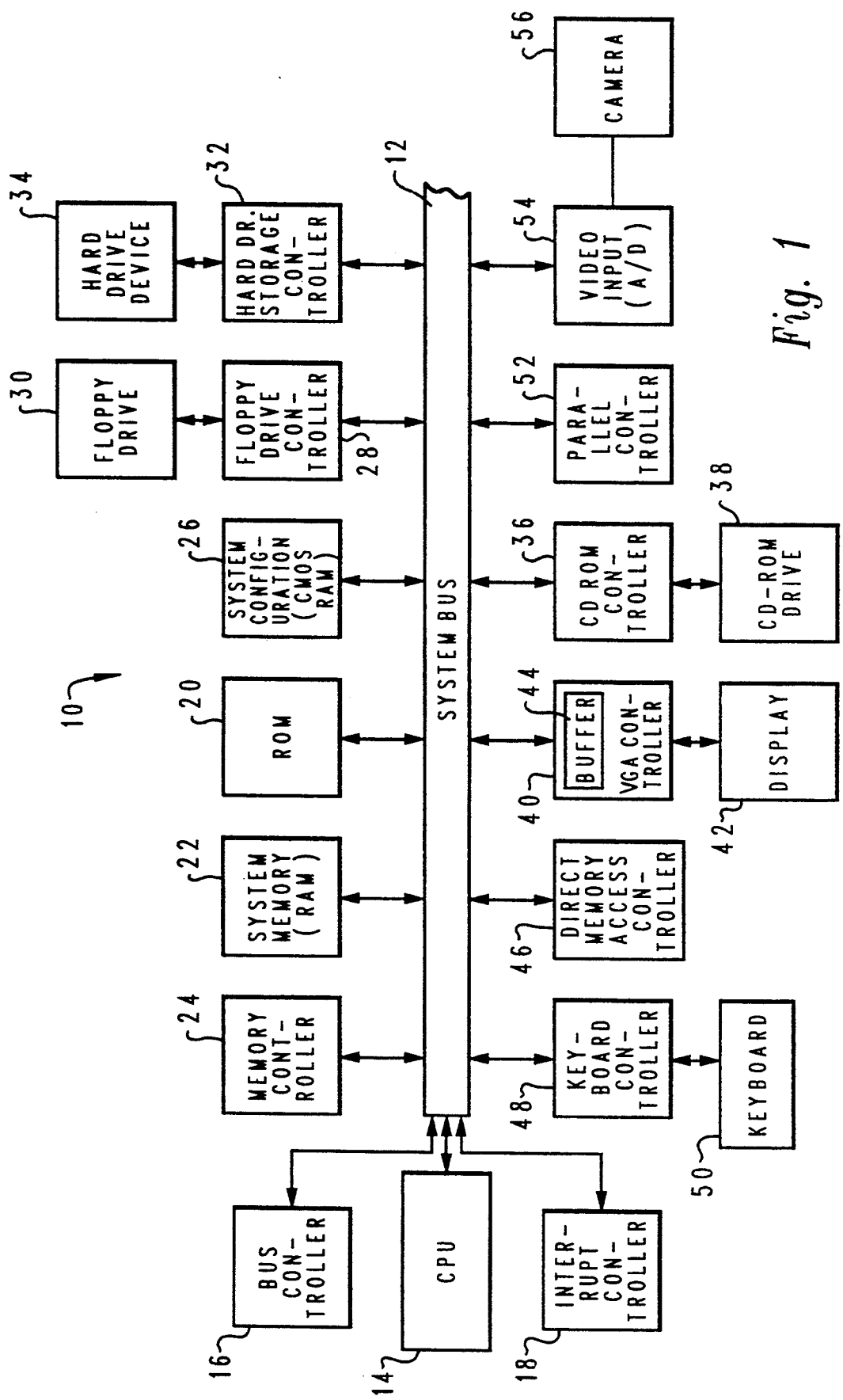
FIG. 1 is a high level block diagram of a data processing system utilized to implement the method of the present invention.

With reference now to the figures and in particular with reference to FIG. 1, there is depicted a block diagram of a personal computer system 10, preferably provided by an IBM PS/2 personal computer. Computer system 10 includes a 16-bit wide system bus 12. Connected to system bus 12 is a central processing unit (CPU) 14, preferably based on an Intel 80386SX or equivalent microprocessor, clocked at a minimum of 16 Mhz. CPU 14 passes data to and receives data from other devices attached to system bus 12 over the system bus. Traffic on system bus 12 is controlled by a bus controller 16. An interrupt controller 18 handles interrupts passed between CPU 14 and the remaining devices.

Read only memory (ROM) 20 is non-volatile memory storing power on test processes and a basic input/output system (BIOS or ROM-BIOS). BIOS is microcode controlling basic hardware operations such as CPU 14 interaction with disk drives and a keyboard. System memory 22 is addressable random access memory into which an operating system and programs are loaded for execution. The IBM OS/2 operating system is a preferred operating system. Additional hardware components of computer 10 attached to system bus 12 include a memory controller 24 and a system configuration store 26, provided by random access memory (RAM) having low refresh power requirements (e.g. complimentary metal oxide semiconductor based memory chips).

Auxiliary data storage is provided by peripheral controllers and associated storage devices including, a floppy disk or diskette controller 28 and drive 30, a hard drive controller 32 and hard drive device 34, and a compact disk (CD) read only memory (ROM) controller 36 with CD-ROM drive 38. Digital video signals, compressed in accordance with the system and method of the invention, may be supplied to computer system 10 from compressed video data stored on portable media mounted in CD-ROM drive 38. After decompression by CPU 14, visual reproduction of video segments is carried out preferably over a video graphics array (VGA) controller 40 and VGA display 42. VGA controller 40 includes a RAM buffer 44 in which a decompressed frame for display is reconstructed. In some computers, buffer 44 may be loaded directly from system memory 22 or from an auxiliary storage controller. In system 10, CPU 14 handles loading of decompressed data to the appropriate locations in buffer 44 for updating the frame.

Direct memory access (DMA) controller 46 handles data transfers between auxiliary storage devices or other input/output devices, and system memory 22 without interaction by CPU 14. Keyboard controller 48 provides an interface to a keyboard 50 for user entries, and may be used to provide an interface to a "mouse". Parallel controller 52 is a device controller for an input or output device (e.g. a printer connected to computer 10 by a parallel cable).

Decompressed video signals may come from a number of sources, including graphics generated by an application program executing on CPU 14 or from a video camera 56 and an associated video interface 54. Video interface 54 converts an analogue National Television Standards Committee (NTSC) video signal into a digital signal. The digital signal consists of a series of bytes of color intensity information (i.e., RGB values) presented serially by rows in frames for the video signal. Typically, color intensity information is digitized into a two bytes per pixel value (i.e., an RGB 16 value) or a three bytes per pixel value (i.e., an RGB24 value). Digital video signals supplied by video input interface 54 are processed by CPU 14 to produce a compressed video signal comprising an initial frame and frame difference information for storage on a hard drive device 34. Alternatively, a CD-ROM may store a video clip represented by data compressed in accordance with the invention. CPU 14 may thereafter recover the clip in the form of the compressed video signal from drive 34 or drive 38 for reproduction of the digital video on display 42.

Figure 2:
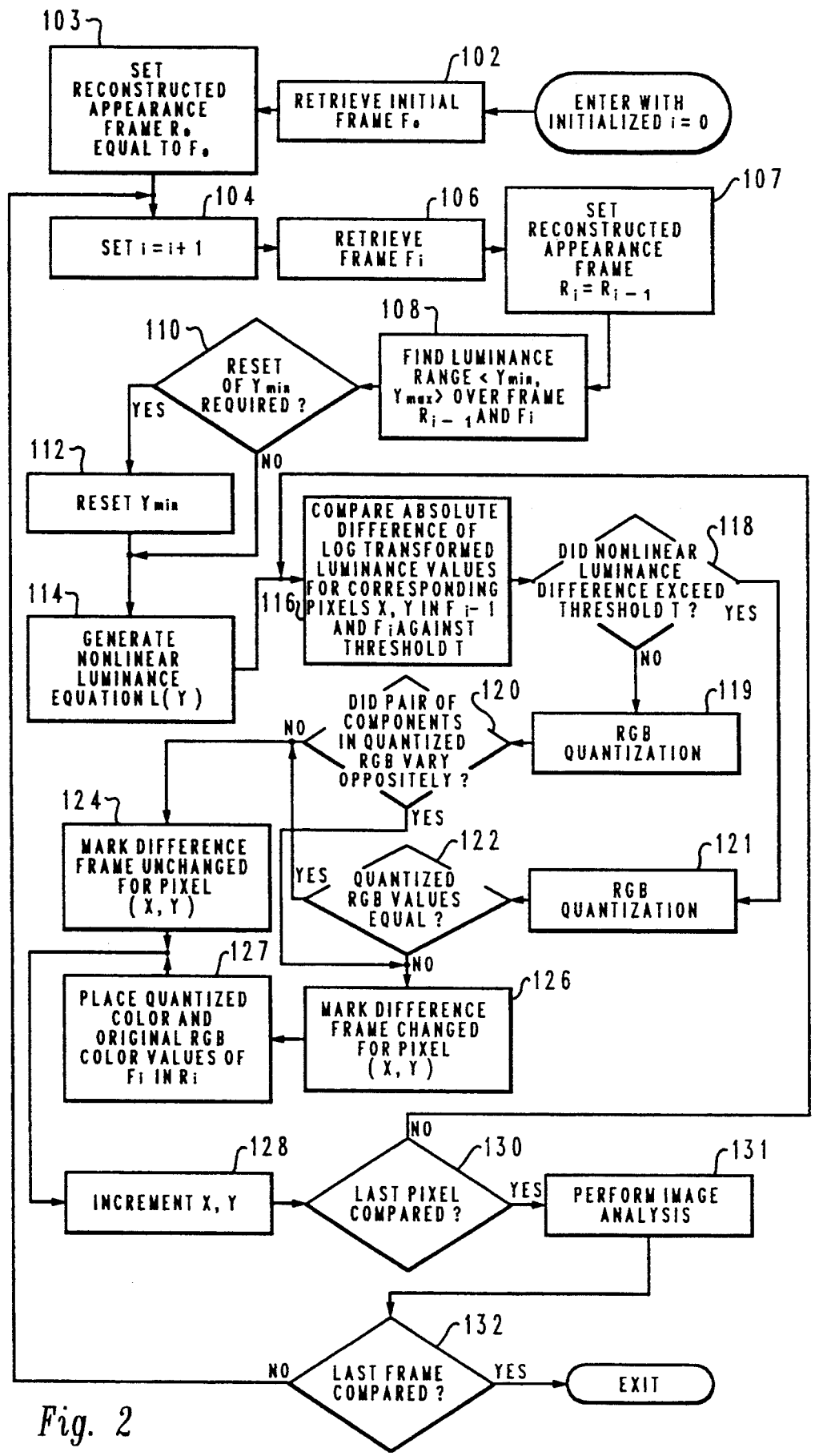
FIG. 2 is a logical flow chart of a frame-to-frame comparison process executed on a data processing system for the compression of digital video signals.

FIG. 2 is a flow chart illustrating the method of the invention as realized through software loaded into system memory 22 and executed as a process on a computer system for frame to frame comparison of a video signal. If the source of the video signal is other than a camera, execution of the processes of FIGS. 2 and 3 need not be in real-time. If computer system 10 is used simply for reproduction of digital video, the processes of FIGS. 2 and 3 are not executed on system 10, but rather are executed in any other more powerful computer to compress digital video signals to be reproduced on system 10.

The luminance of an RGB video signal is obtained using the International Radio Consultative Committee (CCIR) equation:

$$Y = 0.299R + 0.587G + 0.114B \tag{1}$$

where R, G and B are the intensity levels of the red, green and blue components of the point, respectively. Since luminance is a function of the intensity of the color components (i.e. the red, green and blue components) of a pixel, the occurrence of color change in pixels may be detected based on changes in luminance of the pixels. Furthermore, human perception of changes in color detail is less responsive than to changes in luminance (i.e. monochrome detail). Therefore, luminance change detection is used by the present invention, supplemented by provision for detecting those cases where luminance detection has failed.

Furthermore, in the present invention, frame-to-frame differences are measured by simulating how humans perceive luminance information rather than by taking the differences in the actual luminance numerical data. This provides a greater amount of compression without added computational complexity to the decompression process.

The data captured by the sensor of a camera is dependent on the illumination incident on the scene being filmed. In particular, the luminance exhibited in a frame is characterized by the illumination incident on the imaged scene and by the amount of light reflected by objects in the scene. The luminance of a frame can be modeled by:

$$Y(x,y) = i(x,y) * r(x,y) \tag{2}$$

where $i(x,y)$ and $r(x,y)$ denote the value of the illumination and reflectance components at pixel location (x,y), respectively.

The frames are set up for comparison by execution of steps 102, 104, and 106. The process is entered at step 102 with an initialized time period index i=0, and retrieval of an initial full frame $F_o$. Step 103 sets the reconstructed appearance frame $R_o$ equal to $F_o$. At step 104, time period index i is incremented. At step 106, frame $F_i$ is retrieved setting up frames $R_{i-1}$ and $F_i$ for comparison. Step 107 sets the current reconstructed appearance frame $R_i$, which is to be modified after comparison of frames $R_{i-1}$ and $F_i$, equal to $R_{i-1}$. Frame $R_{i-1}$ is the original frame as modified through the previous i−1 time periods.

To simulate the non-linear transformation on the luminance data performed by humans, detection of differences between two successive frames of video data is done through an implementation of a log-transformation on the luminance data of the frames, $R_{i-1}$ and $F_i$. The log-transformation is implemented by assuming that a human would likely perceive the same change in luminance intensity between intensity levels of Y and 2Y as between 2Y and 4Y. A human perceives geometric progression as a linear progression. This technique is particularly effective with natural color video clips (i.e. clips captured by a camera). One of the advantages of performing a log-transformation is that multiplicative illumination changes recorded in the captured video are made additive.

Direct application of any transformation is complicated by the limited color and luminance resolution of computer system 10. Where [O, $Y_{max}$] is the luminance scale resolution, the implementation of the log-transformation can be expressed as:

$$L(Y) = [P(Y_{max} + 1) - 1]\frac{\log(Y + 1)}{\log(Y_{max} + 1)} \qquad (3)$$

where P is equal to a fraction of the luminance scale resolution of the data (e.g. $Y_{max}=255$ for an 8-bit of luminance resolution). However, equation (3) compresses the high end of the luminance scale and stretches the low end. In frames that exhibit information only in the bright range of the luminance scale compression results in visual distortion. Hence, the dynamic range of the luminance information in every two consecutive frames, $R_{i-1}$ and $F_i$, rather than the absolute luminance scale, is transformed. The transformation on the dynamic range of the luminance information of every two consecutive frames is expressed as:

$$L(Y) = Y_{min} + \qquad (4)$$
$$[P(Y_{max} - Y_{min} + 1) - 1]\frac{\log(Y + 1) - \log(Y_{min} + 1)}{\log(Y_{max} + 1) - \log(Y_{min} + 1)}$$

where P gives L(Y) a resolution equal to a fraction of the original dynamic range, and thus has an effect in controlling the amount of compression obtained. As the value of P decreases, the compression attained increases. Once the transformation is performed, it is stored in a lookup table.

The first substantial step in comparing consecutive frames is the determination of the range of luminance intensities in the two frames. Steps 108, 110 and 112 control determination of these equation parameters. The luminescence Y of each pixel in the two frames $R_{i-1}$ and $F_i$ are evaluated using the RGB values for each pixel in equation (1) (step 108). This returns $Y_{max}$ and a prospective $Y_{min}$.

A potential problem in determining the luminance range for a pair of sequential frames is the presence of black video vertical and/or horizontal lines often found framing the video signal. The presence of the black lines along the periphery of frames force $Y_{min}$ to zero even though nothing within the two frames in fact is black. For the reasons given above, the compression method will provide poor quality in frames that contain black video lines but whose actual information is only in the bright (i.e. high) range of the luminance scale. To correct this problem, a histogram of the luminance information for the pixels of the consecutive frames is developed. If the distribution is discontinuous between zero and the higher levels, the actual distribution probably excludes the zero intensity level. Such discontinuity is detected at step 110. Step 112 is then executed to reset $Y_{min}$ to the lowest luminescence level having an instance in the consecutive frames, excluding the zero level. With determination of $Y_{max}$ and $Y_{min}$, the log-transformed luminance value for each Y from $Y_{min}$ to $Y_{max}$ is now generated (step 114) using equation (4) and stored in a lookup table.

As an alternative to resetting $Y_{min}$, a specified number of rows at the top and bottom of frames $F_{i-1}$ and $F_i$, as well as a specified number of columns in the frames at the very left and right, can be disregarded during the search for $Y_{min}$ and $Y_{max}$ in step 108. In this approach steps 110 and 112 are bypassed.

As yet another alternative to resetting $Y_{min}$, a second parameter, S, can be used so that the transformation can skip over the lower S luminance values. That is, if $Y_{min} < S$, the pixels whose values are in the range of luminance values from $Y_{min}$ to $(S-1)$ are represented by their luminance values during frame to frame comparisons, while pixels in the range from S to $Y_{max}$ are compared using their log-transformed luminance values. Selection of the value of S also effects the amount of compression obtained. As the value of S gets closer to zero, the compression attained increases, at the potential cost of increasing distortion of the video signal.

The heart of the compression method is the determination of the luminance intensity difference at a pixel location in consecutive frames (step 116). The difference is determined by the equation:

$$\Delta Y = |L(Y_{i-1}(x,y)) - L(Y_i(x,y))| \qquad (5)$$

where L(Y) is the log-transformed luminance value of a pixel determined in accordance with equation (4).

Determination of whether a pixel (x,y) has changed by comparing dY against a threshold T. Thus if $\Delta Y$ satisfies the relationship:

$$\Delta Y < T \qquad (6)$$

pixel (x,y) is considered to have not changed from frame $R_{i-1}$ to frame $F_i$. If the relationship is not satisfied, the pixel is considered to have changed (step 118). Selection of T effects the amount of compression obtained. As the value of threshold T increases, the amount of compression achieved increases. As T decreases, the amount of compression obtained decreases.

The values of pixels that differed from frame to frame are coded with an 8-bit RGB color representation (i.e., RGB color quantized values) along the YES branch of the threshold comparison of step 118 to benefit from possible additional data reduction (step 121). If the original video data was represented in an RGB16 or RGB24 color format, a 2 to 1 or 3 to 1 data reduction, respectively, is obtained.

After obtaining the 8-bit RGB color representation of the two pixels (step 121), a determination of whether the quantized RGB values for the pixels are equal is checked (step 122). Along the NO branch from step 118, step 119 performs 8-bit RGB quantization and at step 120 it is determined if any pair of color components of the quantized RGB intensities varied oppositely while the remaining color component was unchanged. Step 120 is a provision for detecting those cases where the luminance similarity test of step 118 provides a false result.

Opposite variation in a pair of quantized RGB values can result in unchanged luminance in pixel (x,y) from frame $R_{i-1}$ to frame $F_i$ when the color in fact changed. If no such oppositely directed change in color components occurred, the status of no change in the pixel is confirmed (the NO branch from step 120) and execution continues with step 124. If opposite variation of a pair of quantized RGB values occurred, the status of "no change" is replaced to "changed" and execution of step 126 follows.

Execution of step 122 follows an indication of a "changed" pixel from step 118 and results in the comparison of the quantized RGB color value for a pixel in consecutive frames. Minimal differences between the pixels may be defined and ignored. A change in RGB values between pixels results in a confirmation that the pixel has changed from frame $R_{i-1}$ to $F_i$ (the NO branch leading to steps 126 and 127). The YES branch (leading to step 124) indicates "no change" between the pixels.

With execution of step 124, a preliminary difference bit map 60 (See FIG. 4) is marked with a "1" at a location corresponding to the pixel just examined to indicate the change. With execution of step 126, a preliminary difference bit map 60 is marked with a "0" at a location corresponding to the pixel just examined to indicate no change. Step 127 deposits the color value of pixel (x,y) of frame $F_i$ at location (x,y) of an array in the computer memory that represents the reconstructed appearance of frame $F_i$ (Frame $R_i$) at playback. Two color values are retained per pixel in $R_i$, the original RGB color value and the quantized color value. Step 128 is then executed to reposition the pointer into Frames $F_{i-1}$ and $F_i$. If the last pair of pixels in the frames have not been analyzed, step 130 returns processing to step 116. If the last pixels have been compared, image analysis 131 (See FIG. 3) is performed before confirming the difference bit map and to modify the color values for the pixels of frame $F_i$ to be passed to the next comparison cycle. Step 132 follows image analysis to determine if any frames remain for comparison.

Figure 3A:
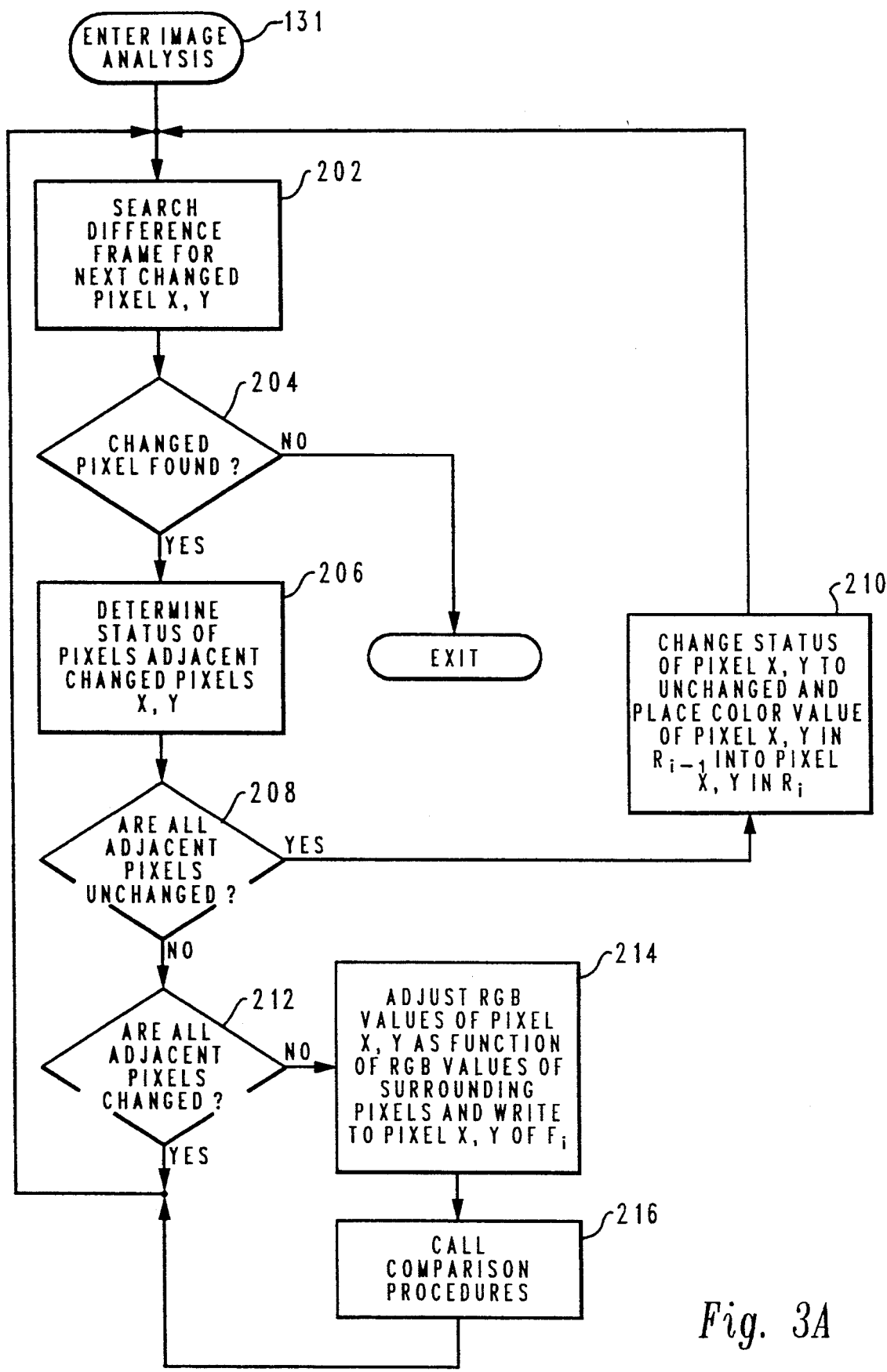
FIGS. 3A and B are logical flow charts of processes used in filtering the data before compression.
Figure 3B:
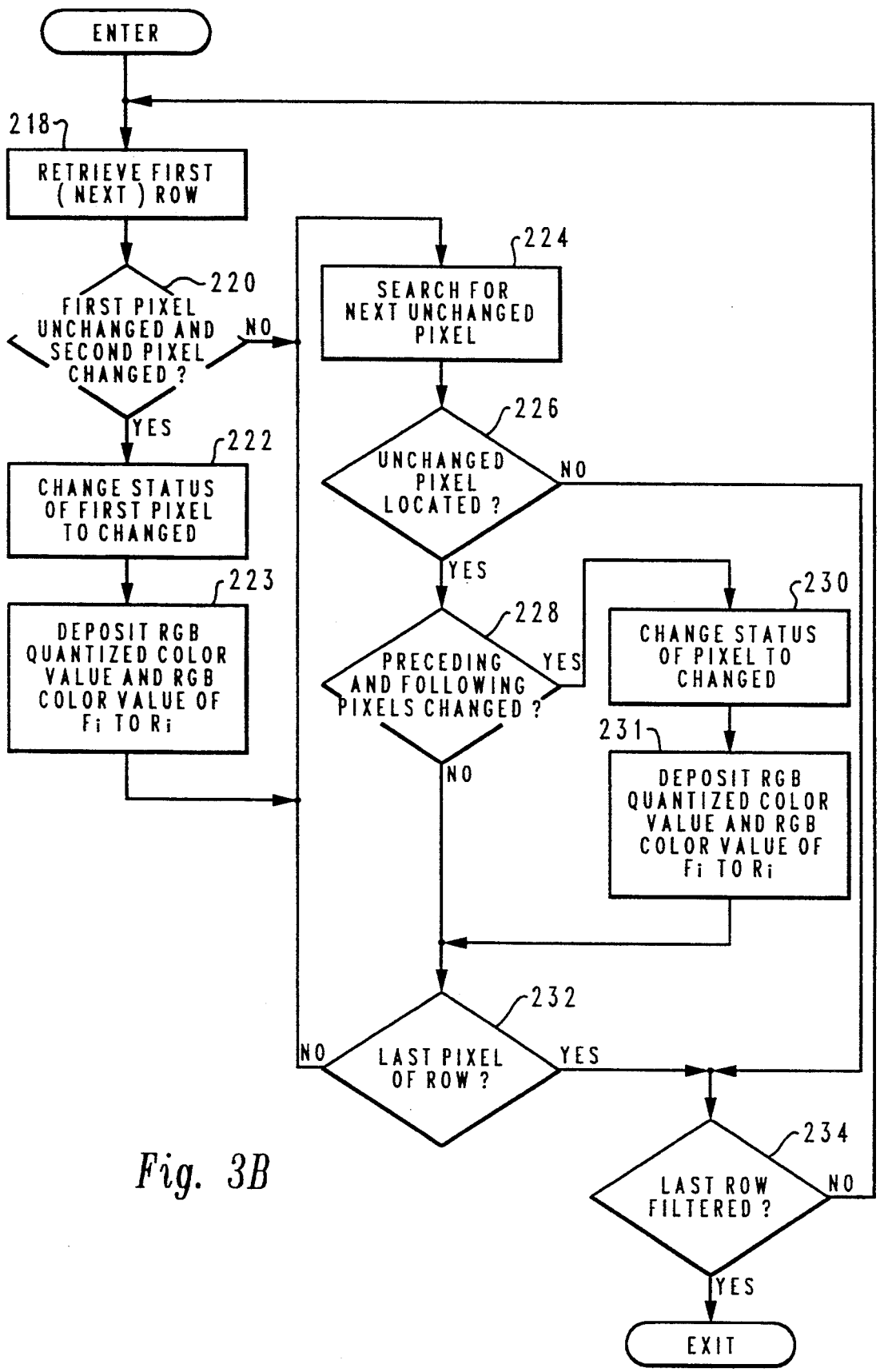

FIGS. 3A and 3B illustrate a process for image analysis and filtering occurring at step 131 of FIG. 2. The process utilizes the preliminary difference frame 60 described below in connection with FIG. 4. Upon entry to the process, the preliminary difference bit map 60 is searched in a raster scan for an instance of a changed pixel. If a changed pixel is not located, decision step 204 terminates the process along its NO branch. If a changed pixel is detected, the pixels bordering the pixel are examined for status (step 206). If all bordering or adjacent pixels are unchanged in status, step 208 directs the process along its YES branch to step 210. With execution of step 210, the current pixel is changed in status to a status of unchanged in a final difference bit map 62 and the color value of the corresponding pixel in frame $R_{i-1}$ is inserted into the current reconstructed appearance frame ($R_i$). Processing is then returned to step 202 to locate the next changed pixel.

If a changed pixel borders any other pixel which exhibits a "changed" status, it is determined at step 212. If all of the adjacent pixels are changed (the YES branch), no action is taken respecting the pixel. If some of the adjacent pixels are unchanged the pixel is a border pixel. Step 214 is executed to change the RGB value for the detected border pixel in the current frame to a value obtained as a function of the RGB values of the adjacent pixels and the border pixel. The RGB value that the function yields is substituted into the current frame $F_i$. Such a function can yield the averaged RGB value over the 3 by 3 pixel neighborhood of the border pixel. Alternatively, median filtering can be performed over the 3 by 3 pixel neighborhood of the border pixel.

With execution of step 216, steps 121,122, 126 and 127 of the process of FIG. 2 are called as a subroutine. If the new quantized RGB value of the pixel is equal to the quantized RGB value of the pixel in $R_{i-1}$ the value for the pixel from the previous frame is written to the current reconstructed appearance frame and the pixel status in the difference frame 62 set to 0.

After conversion of selected changed pixels to unchanged, isolated unchanged pixels are converted in status to changed. FIG. 3B illustrates the filtering process applied to each frame for this purpose. Entered with step 218 the process retrieves the first (or next) row of the difference bit frame. At step 220 it is determined if the first pixel's status is unchanged and if the first pixel is followed by a pixel with status of changed. If YES, step 222 is executed to change the status of the pixel to changed. Step 223 deposits the color value of pixel (x,y) of frame $F_i$ at location (x,y) of $R_i$ as a quantized color value and as the original RGB color value.

Along the NO branch or following step 222, step 224 is executed to search the row for the next unchanged pixel. Upon locating a changed pixel, step 226 directs the process to step 228, where it is determined if the preceding and following pixels are both changed. If both adjacent pixels in the row are changed, step 230 is executed to change the status of the pixel under examination to changed. If the pixel is the last in the row only the preceding pixel is examined. Step 231 deposits the color value of pixel (x,y) of frame $F_i$ at location (x,y) of $R_i$ as a quantized color value and as the original RGB color value. If no unchanged pixel is located in the row, step 226 advances the process to step 234.

Following the NO branch from step 228 or steps 230 and 231, step 232 is executed to determine if the unchanged pixel just examined was the last pixel in the row. If not, the process is returned to step 224. If the pixel was the last in the row, or if no additional unchanged pixels have been found, step 234 determines if the last row of the frame has been filtered. If not, the process returns to step 218 for retrieval of another row. If the last row has been filtered, the process is exited.

FIG. 4 illustrates data structures embodying difference bit maps used to implement image analysis. Image analysis is performed as part of the frame-to-frame comparison process. A pixel is tagged as having changed by writing from the previous frame or as having not changed a "1" or a "0" to a preliminary difference bit map 60. This is a 2-Dimensional binary array of the same size as the frame. After analysis of the image a final difference bit map 62 is generated by changing selected bits of map 60 from a status of changed to unchanged (as in FIG. 3A) or from a status of unchanged to changed (as in FIG. 3B).

The appearance of current frame 64 during playback can be conceived of by depositing its changed pixels or information at their corresponding locations in the preceding frame. Depending on the actual information and the setting of the three parameters that control the amount of compression (and distortions), the deposited information may not visually blend in with the information in prior frame. Steps 214 and 216 of the process of FIG. 3 is used to improve visual quality of a frame by smoothing the color values of the pixels along the borders of the connected image regions that are deposited during playback. Border pixels of connected image regions that will be deposited in buffer 44 are determined by detecting all the pixels with a value of 1 in the binary bit map that are adjacent (in any of the eight possible directions) to a pixel with a value of 0 (step 208 of FIG. 3) in the binary bit map.

First, the connected image regions have to be located (steps 202, 206, 208 and 212). If a pixel with a value of 1 in binary array 60 is surrounded by eight pixels that did not change (i.e. eight pixels whose binary array values are 0), the pixel is considered to be impulsive noise and its classification is marked as unchanged (i.e. "0") in the final bit map 62.

Border pixels of connected regions having more than one pixel are located at step 212. The RGB color value of a detected border pixel is smoothed by averaging the values in each color component of the original RGB data of the pixels in the n by n pixel neighborhood centered at the border pixel, where n equals an odd integer greater or equal to 3 (3 was selected in connection with FIG. 3). Alternatively, border pixels can be smoothed by using median filtering techniques on these n by n pixels, or according to the configuration depicted by the values of these n by n pixels in the binary array. The latter technique enables information to be appropriately averaged in a direction perpendicular to the direction of edges.

After a border pixel inherits its new RGB value, its quantized RGB color value is compared to the quantized RGB color value of the pixel at the same location in the prior reconstructed appearance frame and the difference compared to T (steps 122, 126 and 127 of FIG. 2 conducted in step 216 of FIG. 3A). If the quantized RGB values are deemed equivalent, the pixel is considered as having not changed. The bit location for the pixel in the final difference bit map 62 is marked with a "0". The RGB value and quantized RGB value for the pixel in the prior frame are carried over into the current reconstructed appearance frame 64.

Alternatively, frame-to-frame comparison of $R_{i-1}$ and $F_i$ may be done iteratively. By selecting a large value of T initially, connected image regions in the current frame, that are formed from pixels that changed, will tend to be small. These regions are grown iteratively by detecting their borders, and exposing pixels within a pixel distance R, of the detected borders to the comparison of Equation (6) with progressively smaller values of T. The value of T is reduced in each iteration by a factor. The factor is set as a function of the selected number of iterations of frame to frame comparisons to be used to grow the connected regions. Alternatively, a small value of T can be selected initially to obtain large connected image regions. The borders of these regions can then be eroded iteratively by incrementing the value of T in each of the iterations. In all, three additional parameters whose values can be selected, control the video quality and the amount of video data compression obtained.

Encoding of the frame-to-frame compressed video information occurs after generation of a difference bit map 62 relating to a pair of frames and the reconstructed appearance frame $R_i$ 64 of the decompressed video signal. Compression is done by reference to the current reconstructed appearance frame 64 and by reference to the difference bit map 62. Essentially only those pixels with perceivable changed color information are inserted to the compressed data stream of the video signal. Positioning information for the RGB data in decompressed frames used for video reproduction is inserted in the compressed stream by utilization of the values that palettized color video data does not assume.

To save processing steps during decompression and display and to save ahead of storage storage space, color values of pixels that changed from frame-to-frame are represented as an 8-bit index that is used as an address to a color lookup table (or palette) during the decompression and display process. Typically, a palette contains fewer than 256 color values selected out of $2^{24}$ possible color values.

Since there is a set of values of indices in any palette which are reserved for system use, the values of the color indices in the final encoded video data do not assume these reserved values. However this invention inserts the reserved index values in the encoded compressed video stream as special code words for positioning control of pointers in the decompression and display process.

Figure 5A:
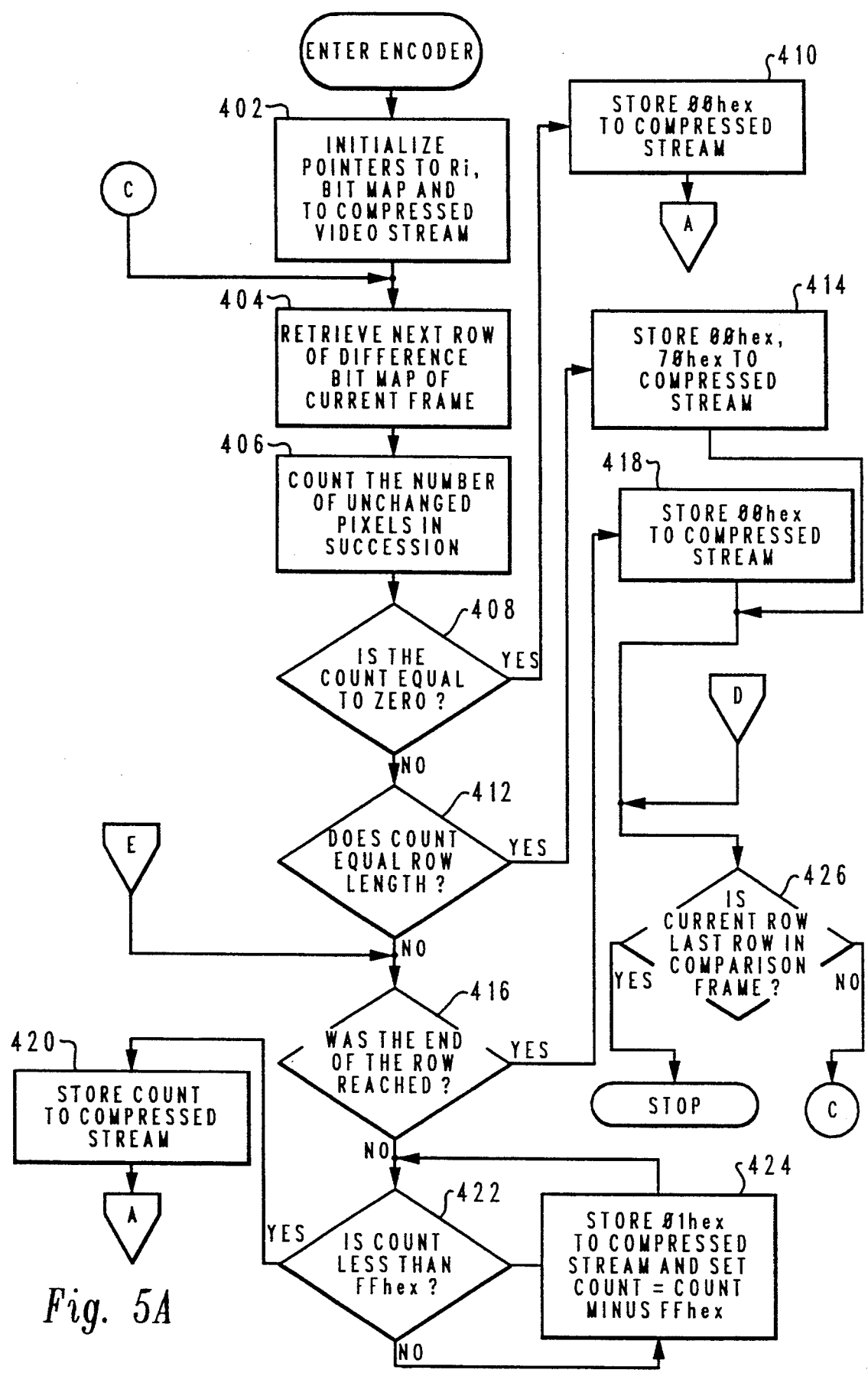
FIGS. 5A and 5B are logical flow charts of an encoding process used in implementing the method of the present invention.
Figure 5B:
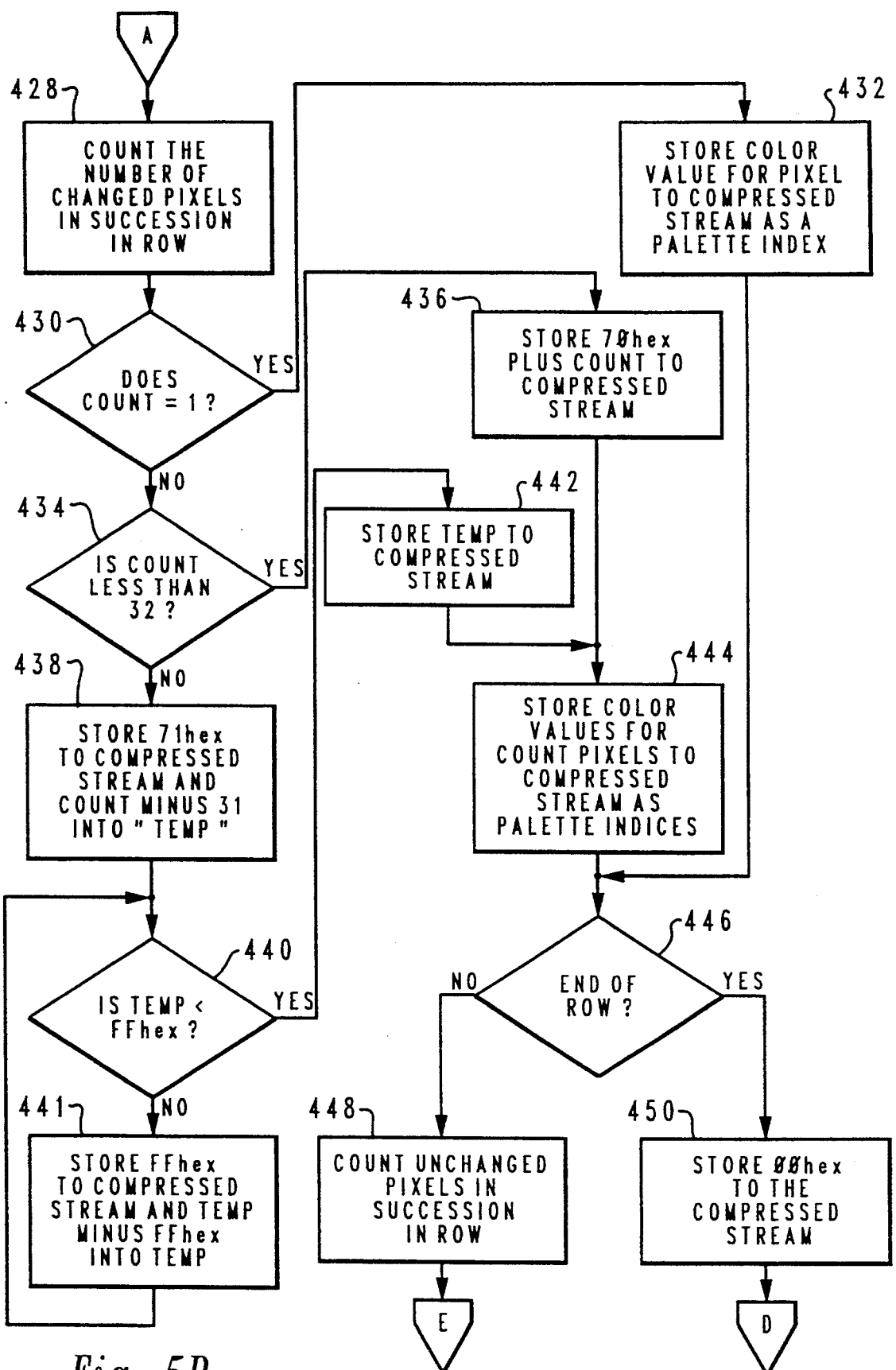
Figure 7A:
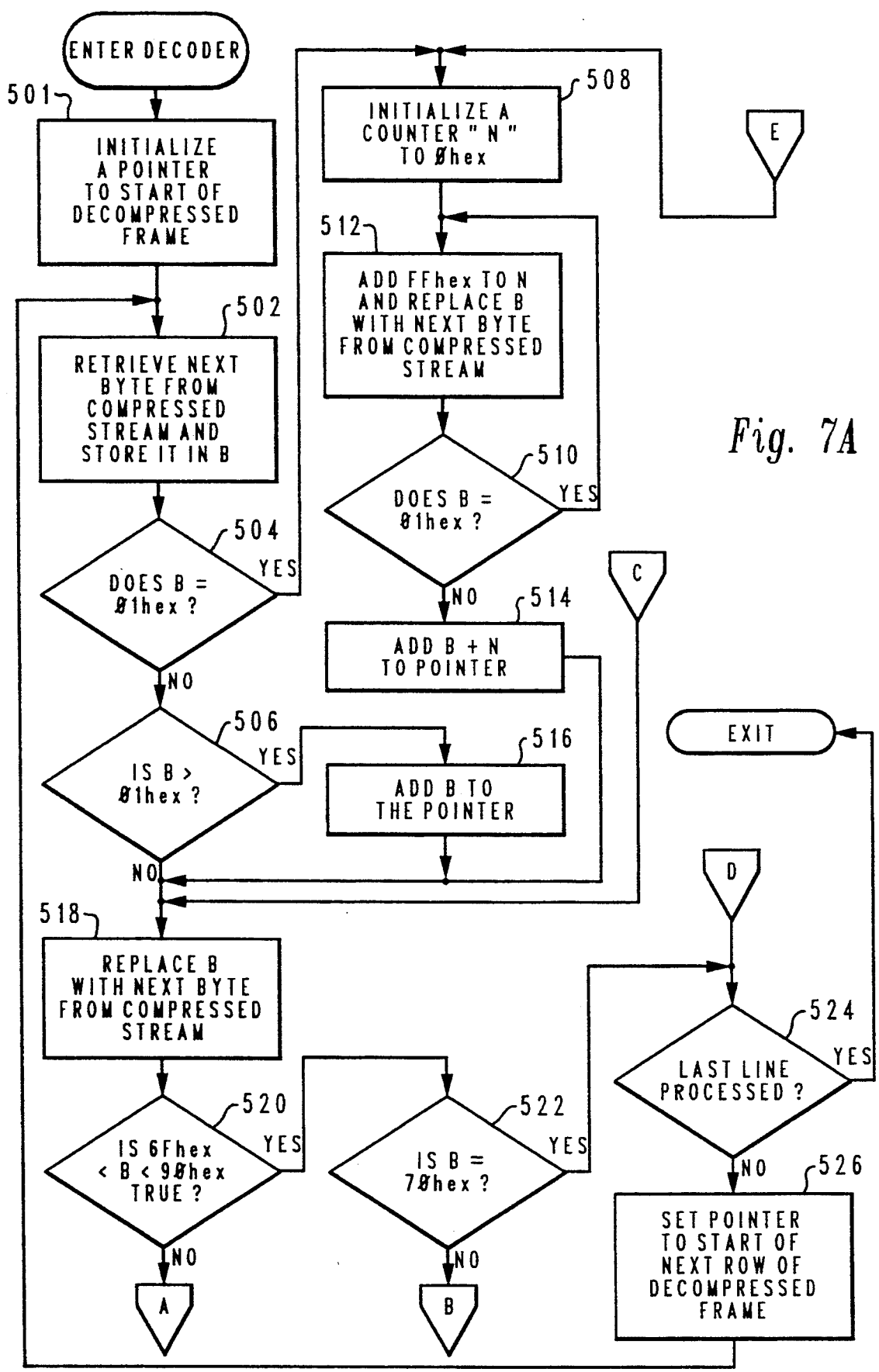
FIGS. 7A and 7B are logical flow charts of a decoder process used in implementing the decompression method of the present invention.
Figure 7B:
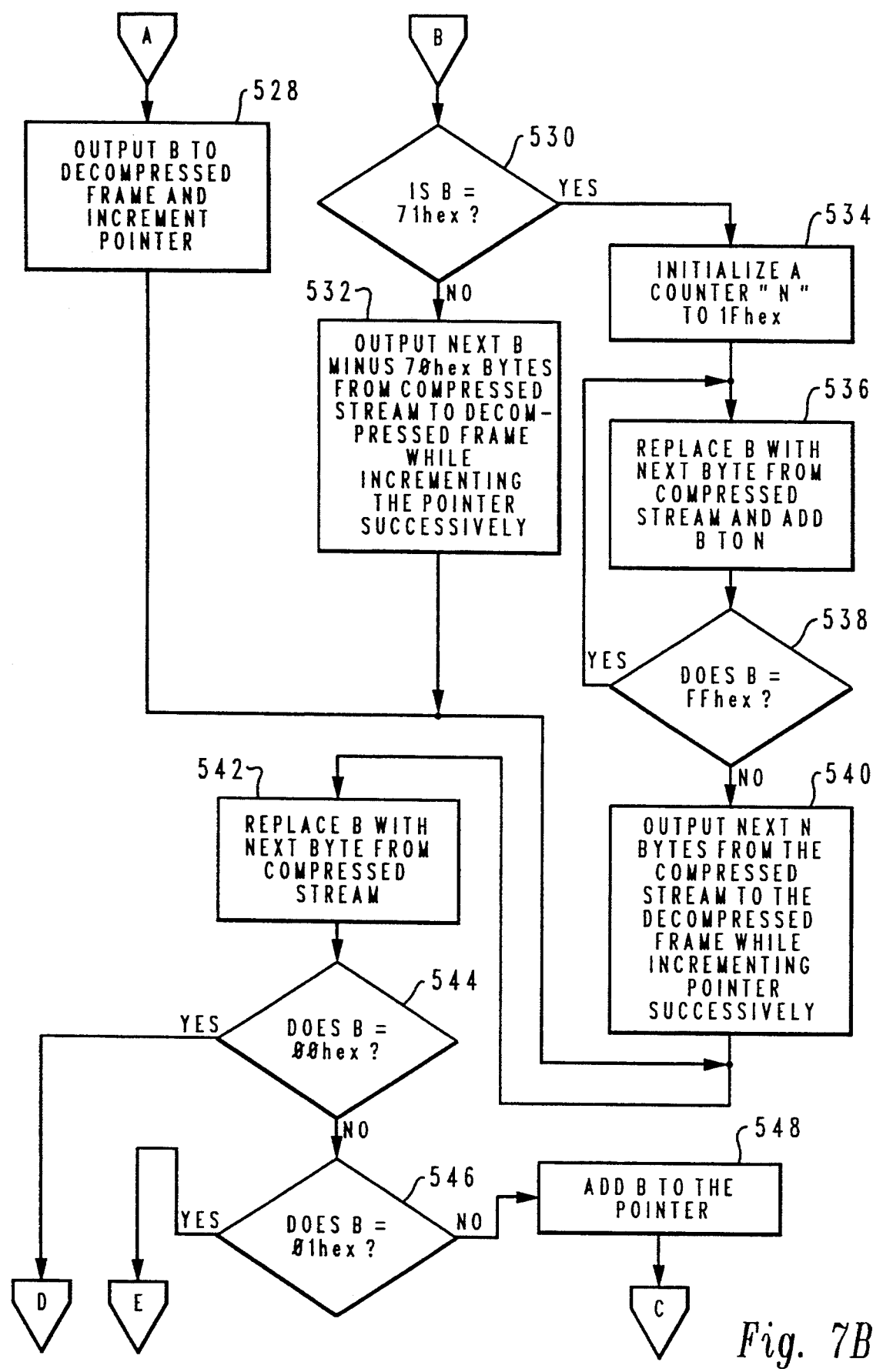

The encoding and decoding processes, illustrated respectively in FIGS. 5A and 5B and in FIGS. 7A and 7B, assume an RGB 784 palette in which 224 of the possible index values specify all the combinations of seven shades of red, eight shades of green, and four shades of blue. The remaining 32 possible index values of the palette, $70_{hex}$ through $8F_{hex}$ are reserved index values which the encoding and decoding processes exploit for use as special code words for positioning control.

The process of encoding a frame compressed with the frame-to-frame comparison process of FIG. 2 is illustrated in FIGS. 5A and 5B. The first steps of the process provide for setting pointers to the frame's difference bit map and the frame's reconstructed appearance frame ($R_i$), and for generating positioning information within the frame. Both types of information are required for the compressed stream. The process is entered with execution of step 402, with the initialization of appropriate counters, including a pointer into the frame's difference bit map, a pointer into the current reconstructed appearance frame, and a pointer to where the encoder deposits the encoded compressed video data (which may be carried over from the encoding of the prior frame). It is noted that all pointers are incremented or updated appropriately throughout the following description. Next, at step 404, the next row from the difference bit map is retrieved. With execution of step 406, the process begins counting the number of successive zeros in the bit map beginning with the first location of the row. If the first location has a "1" indicating a changed pixel, the count ends with "0" and decision step 408 directs the process to step 410 where "$00_{hex}$" (i.e. hexadecimal 0) is inserted into the compressed video stream at the location indicated by the pointer to the compressed video stream. Processing then continues with step 428 in FIG. 5B.

The NO branch from step 408, indicating that unchanged pixels were encountered, leads to execution of step 412. Here the count is compared to the total number pixels in a row. If the entire row is unchanged, the count equals row length and the YES branch form the step is taken to step 414. With execution of step 414, the numbers "$00_{hex}$" and "$70_{hex}$" are inserted to consecutive locations of the compressed video stream. The numbers are tags indicating a row end and an absence of changed pixels for the row. Next step 426 is executed to determine if the last row of the current frame has been compressed. If so, the process is exited. If not, the process is returned to step 404 to retrieve the next row for encoding.

The NO branch from step 412 advances the process to step 416. Step 416 determines if the end of a row of the difference bit map has been reached. This is done because the step may be entered (through off page connector E) from a point where the count of successive, unchanged pixels began at some point other than the beginning of the row. If the end of the row has been reached, the YES branch is followed to step 418 where a "$00_{hex}$" is inserted to the compressed video stream. Next step 426 is executed to determine if the last row of the current frame has been compressed. If so, the process is exited. If not, the process is returned to step 404 to retrieve the next row for encoding.

The NO branch from step 416 takes the process to step 422, where the count of unchanged pixels is compared to "$FF_{hex}$". A count of the number of successive, unchanged pixels is to be inserted into the compressed data stream, however, the maximum number which can be expressed using one byte is "$FF_{hex}$", or 255. For the purpose of describing the count of successive unchanged pixels, byte $FF_{hex}$ is used as a special code word. Thus, if the count goes above "$FE_{hex}$", additional bytes must be used to express the number. Hence the NO branch from step 422 leads to step 424 which results in insertion of "$01_{hex}$" into the compressed stream. "$01_{hex}$" serves a place holder, indicating to the decoder process the need to add "$FF_{hex}$" to at least one following number. "$FF_{hex}$" is then subtracted from the count and the process is returned to step 422 where the reduced count is compared again to "$FF_{hex}$". Eventually the count must fall below "$FF_{hex}$" resulting in execution of step 420, where the residual count is stored to the compressed stream. The number stored by steps 424 and 420 signify the count of the number of successive, unchanged pixels to the decoding process. It is important to note that a count of 256 (i.e., $FF_{hex}$) successive unchanged pixels results in inserting $01_{hex}$ and $00_{hex}$ consecutively to the video compressed stream. The process then continues with step 428 in FIG. 5B.

With execution of step 428 the process counts the number of successive changed pixels from difference bit map 62 in the current row. If the count equals "1", the YES branch from step 430 is followed to step 432, where the pixel's color value, taken from the current reconstructed appearance frame 64, is converted to a palette index (i.e. address) and stored to the compressed video stream. Processing advances to step 446, as described below.

The NO branch from step 430, indicating a plurality of successive changed pixels, results in execution of step 434. The reason for the comparison in step 434 is the limited number of reserved palette index values available as special code words (i.e., from $70_{hex}$ to $8F_{hex}$). The next entry to the compressed video stream at this point is a count of the number of changed pixels followed by the color values of the changed pixels. Because only 32 palette index values are reserved (i.e., $70_{hex}$ to $8F_{hex}$), a maximum count of 31 changed pixels can be specified with one byte. However, two of the reserved palette index values (i.e. "$70_{hex}$" and "$71_{hex}$") are used for other marking purposes since specification of occurrence of zero or one changed pixels is not required. Thus changed pixel counts of 2 to 31 can be provided (a count of 1 receives no prefix count). If the count is less than 32, the YES branch from step 434 is taken to step 436. The NO branch from the comparison leads to step 438. Along the YES branch, step 436 is executed to store the sum of "$70_{hex}$" and the count of successive, changed pixels to the compressed video stream.

Where the number of successive, changed pixels exceeds 31, steps 438, 440, 441 and 442 are used to generate consecutive entries to the compressed stream which allow reconstruction of the number. In step 438 the first value entered into the compressed video stream to represent the count is "$71_{hex}$", which here signifies to the decompression process that a value of 31 is to be added to the count represented by the succeeding bytes to obtain the total count of changed pixels. A variable TEMP is created which receives the value of the Count of changed pixels minus 31 (step 438). Next, at step 440, it is determined if TEMP is less than "$FF_{hex}$". If it is not, following the NO branch to step 441 results in the number "$FF_{hex}$" being inserted to the compressed video stream and subtracted from TEMP. Processing is returned to step 440 until TEMP is reduced below "$FF_{hex}$", whereupon step 442 is executed to store the remainder in TEMP to the compressed video stream.

Step 444 follows either step 442 or 436. Here, the color of each pixel in the string of changed pixels is taken from the current reconstructed appearance frame 64, converted to a palette index value, and stored to the compressed video stream. Since the number of changed pixels is equal to "count", the number of palette indices stored consecutively to the compressed video stream in step 444 is equal to "count." Following step 444 or 432 the process determines with execution of step 446 if the end of the row was reached. If YES, $00_{hex}$ is stored as a marker in the compressed stream (step 450) and the process is returned to step 426 of FIG. 5A. If the end of the row has not been reached, a count is made of the number of unchanged pixels in succession (step 448) and the process is returned to step 416 of FIG. 5A.

FIG. 6 illustrates a compressed video data stream 66 in conformance with the system and method of the invention. Compressed stream 66 is a compressed representation of the data structures including difference bit map 62 and reconstructed appearance frame $R_i$ 64. Video compressed stream 66 comprises a plurality of bytes of sequenced data which: byte 68 has the value "$03_{hex}$" indicating a sequence of three unchanged pixels; byte 70 has the value "$72_{hex}$" indicating that the next two bytes 72 and 74 in the sequence represent two palette indices for two pixels that changed from the previous frame; byte 76 has the value "$00_{hex}$" marking the end of the first row; byte 78 has the value "$03_{hex}$" indicating three unchanged pixels; byte 80 has the value "$72_{hex}$" again indicating that the subsequent 2 bytes 82 and 84 of the stream contain the color information for two changed pixels; byte 86 has the value "$00_{hex}$" marking the end of the second row; byte 88 has the value "$03_{hex}$" again indicating 3 consecutive unchanged pixels; byte 90 has color data (which is detectable because it does not assume a value between "$70_{hex}$" and "$8F_{hex}$", inclusive); byte 92 has the value "$00_{hex}$" marking that the end of the row was reached without encountering additional changed pixels; and bytes 94 and 96 have the values "$00_{hex}$" and "$70_{hex}$" respectively indicating that the final row had no changed pixels. Compressed stream 66 is similarly constituted through all of the frames and for any size of frame.

FIGS. 7A and 7B illustrate a frame decompression and reconstruction process executable in real-time on an Intel 80386SX microprocessor based personal computer running at 16 Mhz. Much of the processing is concerned with positioning a pointer into a decompression frame consisting of null values and color values as palette indices for pixels where the values changed in comparison to the previous frame. The process is entered by setting a pointer to pixel (O,O) of a frame to be decompressed and reconstructed (step 501). With execution of step 502, a byte is retrieved from the compressed video stream and stored in "B", typically by reading data representing the stream stored on a portable media inserted into a CD-ROM player.

At step 504, the retrieved byte is compared to "$01_{hex}$". The value "01" signifies 256 consecutive unchanged pixels and a displacement of the pointer into the decompression frame by 256 consecutive pixel locations in the current row. Thus the YES branch from step 504 leads to step 508 where a counter "N" is initialized for use in counting the number of consecutive unchanged pixels. Next, step 512 is executed incrementing the counter N by "FF$_{hex}$" and retrieving the next byte of the compressed video stream for storage stored in "B." The process continues to step 510 to compare the new byte to "01$_{hex}$". When B finally fails to match "01$_{hex}$", the value of the current byte is added to the counter N and that sum is added to the pointer into the decompression frame (step 514). The net result is that the desired number of (unchanged) pixels are skipped in the frame being decompressed and reconstructed. The process than continues with step 518.

The NO branch from step 504 moves the process on to step 506, where it is determined if the current byte is greater than "01$_{hex}$", which if true results in the addition of the value stored in "B" to the current value of the pointer into the decompression frame (step 516). Step 518 is reached from steps 514, 516, or the NO branch from step 506. The NO branch from step 506 is only executed when B is 00$_{hex}$. With execution of step 518 the next byte from the compressed stream is retrieved and stored in "B."

The next byte should either be information regarding the length of a subsequent string of changed pixels, the color value (as a palette index) for a single changed pixel, or a marker for an end of a row (i.e. "70$_{hex}$"). At step 520 it is determined if the value of the byte falls between "6F$_{hex}$" and "90$_{hex}$", noninclusive. If it does not, the byte is a color value expressed as a palette index for a single changed pixel and processing continues with step 528 in FIG. 7B. If the value of "B" in step 520 falls within the given range (i.e. it is one of the reserved palette index values), step 522 is executed to determine if the value of "B" is "70$_{hex}$" indicating the end of a row. If it is, step 524 is executed to determine if the last row of the decompressed frame has been processed. If YES, the process is exited. If NO, step 526 is executed to move the pointer into the decompressed frame to the first location in the next row of the frame and processing is returned to step 502.

The NO branches from steps 520 and 522 lead to steps 528 and 530, respectively. With execution of step 528 the value for the current byte (i.e., the content of "B") is placed into the decompression frame at the location indicated by the pointer. The pointer is then incremented by one.

Where the process has followed the path leading to step 530, it has been determined that a plurality of successive color values, each expressed as a palette index, will be placed to successive locations in the current row of the decompression frame. As noted above, special code words were employed to encode the number of successive changed pixels. A special code word (byte) of a value of "71$_{hex}$" is detected at step 530. If B does not equal "71$_{hex}$", "70$_{hex}$" is subtracted from the value of B to determine the number of successive locations in the decompression frame to receive successive bytes, each a palette index, from the compressed video stream. The bytes are then loaded into the decompression frame and the pointer into the frame is incremented to point to the first location after the group of successive changed pixels (step 532).

Where the value of "B" equaled "71$_{hex}$", steps 534, 536, and 538 are executed to determine the number of successive changed pixels. Once the number N of successive changed pixels has been determined, N successive bytes are read from the compressed video stream and written to the decompression frame and the decompression frame pointer is repositioned to the location immediately following the group of successive changed pixels (step 540).

From step 528, 530 and 532 or 530, 534, 536, 538 and 540, step 542 is next executed to recover the next byte from the compressed video stream. The value of the recovered byte can signify one of three things: (1) that the end of the row was reached with the last changed pixel or that a string of unchanged pixels following the last changed pixel extends to the end of the row (indicated by the value of the byte of "00$_{hex}$" detected at step 544 and resulting in return of the process to step 524 to determine if the last line has been processed); (2) that a string of unchanged pixels not extending to the end of the row and exceeding "FF$_{hex}$" follows the last changed pixel (indicated by the value of the current byte being "01$_{hex}$", detected at step 546 and resulting in return of the process to step 508); and (3) that a string of unchanged pixels numbering fewer than "FF$_{hex}$" and not extending to the end of the row follows the last changed pixel (indicated by "B" being a value other than 00$_{hex}$ or 01$_{hex}$. Step 548 is then executed to add the "other value" stored in "B" to the decompression frame pointer and the process is returned to step 518).

FIG. 8 illustrates a reconstructed decompression frame 98 in which replacement data for a video buffer recovered from the compressed video stream has been written.

The present invention is applicable to a wide range of video clips, including video clips of individuals speaking against a relatively stationary background, and panoramic video clips with motion trajectories. The techniques disclosed have attained an 8 to 1 compression improvement over traditional frame differencing methods while simultaneously maintaining low computational complexity in the decompression process and providing high video quality during playback.

The encoding process provides greater compression than coding the bit map and a sequential list of pixel values that differed from the previous frame. The process simultaneously reduces the numerical complexity of the decompression task. The present invention provides sufficient compression to enable a personal computer with an Intel 80386SX processor running at 16 Mhz to use only the computational capabilities of its processor to decompress and playback video clips with a frame size of 320×240 pixels at 15 frames per second, while simultaneously satisfying contemporary CD-ROM bandwidth requirements.

The invention provides for decompression and playback of video on unmodified Intel 80386SX based computers, where the compression methodology is typically asymmetrical. In such applications, the compression process is not subject to the same computational constraints as the process of decompression and playback and the compression process is not required to perform its work at video frame rates.

While the invention has been particularly shown and described with reference to a preferred embodiment, it will be understood by those skilled in the art that various changes in form and detail may be made therein without departing from the spirit and scope of the invention.

What is claimed is:

1. A method of compressing a color video segment, the method comprising the steps performed by a computer system of:

recording the color video segment as a sequence of frames, each frame comprising a plurality of pixels organized in an M×N array of pixel locations;

determining parameters for a non-linear luminance function from a luminance range for consecutive first and second frames in the sequence of frames;

generating a luminance value for each pixel in the first and second frames by using a color specification value for each pixel as an input to the non-linear luminance function;

comparing the first and second frames by comparing the luminance values at corresponding pixel locations in the frames;

responsive to compared luminance values differing at a pixel location between the first and second frames, marking a corresponding pixel location in an M×N difference map as changed;

generating a data string from the M×N difference map and the second frame comprising a sequential list of color values from the second frame occurring at the marked pixel locations in the M×N difference map; and inserting values unused for specification of color values into the data string as decompression control information.

2. A method of compressing a color video segment as specified in claim 1, and further comprising:

storing the data string on a portable media of an auxiliary data retrieval device.

3. A method of compressing a color video segment as specified in claim 2, and further comprising steps for displaying the color video segment from the data string comprising:

establishing a pointer into a pixel location in an M×N decompressed frame;

retrieving the data string from the portable media through the auxiliary data retrieval device;

responsive to retrieval of a color value in the data string, placing the color value into a pixel location of the decompressed frame at a pixel location indicated by the pointer;

repositioning the pointer by one pixel location upon placement of a color value;

responsive to the decompression control information, positioning the pointer to a new pixel location; and generating a reconstructed appearance frame from an originating frame for the video segment by accumulating changes to the originating frame from successive M×N decompression frames.

4. A method of compressing a color video segment as specified by claim 1, wherein the non-linear luminance function is of the form $$L(Y) = Y_{min} + [P(Y_{max} - Y_{min} + 1) - 1] \frac{\log(Y + 1) - \log(Y_{min} + 1)}{\log(Y_{max} + 1) - \log(Y_{min} + 1)}$$

where P is a selectable parameter, $Y_{max}$ is a maximum luminance exhibited by any pixel in the first and second frames and where $Y_{min}$ is a minimum luminance exhibited by any pixel in the first and second frames, the method further comprising the step of:

selecting P to yield a resolution scale equal to a fraction of the luminance range for the consecutive first and second frames.

5. A method of compressing a color video segment as specified by claim 4, further comprising determining a minimum luminance value $Y_{min}$ for a luminance values range for the consecutive first and second frames in the sequence by:

accumulating a histogram of luminance values for the pixels in the first and second frames;

responsive to the minimum luminance value being zero and the distribution of the histogram being discontinuous between zero intensity and a next lowest luminance value represented pixels in the consecutive first and second frames, setting $Y_{min}$ equal to the next lowest intensity level.

6. A method of compressing a color video segment as specified by claim 4, further comprising determining a minimum luminance value from a luminance values range for the consecutive first and second frames in the sequence by:

excluding a predetermined number of rows and columns along edges of the consecutive first and second frames from consideration.

7. A method of compressing a color video segment as specified in claim 4, and further comprising:

responsive to user selection of S, skipping the S lowest luminance values in evaluating the function of claim 5; and comparing pixel locations with a luminance value among the S lowest luminance values by direct comparison of the luminance values.

8. A method of compressing a color video segment as specified by claim 1, wherein the step of comparing the first and second frames by comparing the luminance values at corresponding pixel locations comprises:

subtracting the luminance values for the pixels at a corresponding pixel location to generate a difference value;

finding an absolute value of the difference value; and comparing the absolute value of the difference value against a user selected threshold.

9. A method of compressing a color video segment as specified in claim 8, and further comprising:

responsive to a determination in the step of comparing luminance values at corresponding pixel locations in the first and second frames that luminance values for a corresponding pixel location varies by less than the threshold, verifying that a change did not occur by determining if any pair of color quantized components for the pixel in the second frame varied oppositely from a corresponding pair of color quantized components for the pixel in the first frame; and responsive to finding from the step of comparing luminance values that pixel luminance at a corresponding pixel location in the first and second frames varies by more than the threshold, determining that no change occurred in a quantized color component for the pixel of the second frame.

10. A method of compressing a color video segment as specified by claim 8, filtering the M×N difference map to remove isolated marks of changed and unchanged pixels.

11. A method of compressing a color video segment as specified by claim 10, wherein the step of filtering:

remarking a pixel location unchanged where the pixel location in the M×N difference map was marked as changed and all adjacent pixel locations in the M×N bit map are marked unchanged; and remarking a pixel location changed where the pixel location in the M×N difference map was marked unchanged and the adjacent pixel locations in the row of the pixel location are marked changed;

wherein the steps of remarking pixel locations unchanged are completed before remarking pixel locations as changed.

12. A method of compressing a color video segment as specified in claim 8, and further comprising:

detecting connected regions of changed pixels in the second frame from the first frame;

determining border pixels on a border of the connected regions; and smoothing the color value for each border pixel by adjusting the color value as a function of the color values for neighboring pixels.

13. A method of compressing a color video segment as specified in claim 12, wherein the step of smoothing comprises averaging the color values for a border pixel and neighboring pixels to the border pixel.

14. A method of compressing a color video segment as specified in claim 12, wherein the step of smoothing comprises median filtering on a neighborhood around a border pixel.

15. A method of compressing a color video segment as specified in claim 12, wherein the step of smoothing comprises averaging color values for pixels taken in a direction perpendicular to the border.

16. A method of decompressing a frame differencing compressed video stream, the method including the steps performed by a computer system of:

providing a decompressed video frame;

establishing a pointer into pixel locations of the decompressed video frame;

retrieving a frame differencing compressed video stream wherein the frame differencing compressed video stream includes values for color video information and values for control information;

responsive to a value for color video information, placing the value to a pixel location indicated by the pointer and incrementing the pointer; and responsive to a value for control information, repositioning the pointer to a pixel location indicated by the control information.

17. A method of decompressing a frame differencing compressed video stream as set forth in claim 16 wherein the decompressed video frame is in random access memory.

18. A data processing system for decompressing a frame differencing compressed video stream, comprising:

video display buffer means for storing a decompressed video frame;

a pointer into pixel locations of the decompressed video frame;

means for retrieving a frame differencing compressed video stream wherein the frame differencing compressed video stream includes values for color video information and values for control information;

means responsive to a value for color video information for placing the value to a pixel location indicated by the pointer and incrementing the pointer; and means responsive to a value for control information for repositioning the pointer to a pixel location indicated by the control information.

19. A data processing system for compressing a color video segment, comprising:

means for recording the color video segment as a sequence of frames, each frame comprising a plurality of pixels organized in an $M \times N$ array of pixel locations;

means for determining parameters for a non-linear luminance function from a luminance values range of pixels in consecutive first and second frames in the sequence of frames;

means for generating a luminance value for each pixel in the first and second frames by using color specification values for each pixel as inputs to the non-linear luminance function;

means for comparing the first and second frames by comparing luminance values for pixels at corresponding pixel locations;

means responsive to luminance values at a corresponding pixel location differing between the first and second frames for marking a corresponding pixel location in an $M \times N$ difference map as changed;

means for generating a data string from the $M \times N$ difference map and the second frame, the means for generating including a sequential list of color values from the second frame occurring at the marked pixel locations in the $M \times N$ difference map; and means for inserting into the data string values unused for specification of color values to specify decompression control information.

20. A data processing system for compressing a color video segment as set forth in claim 19, and further comprising:

means for storing the data string on a portable media for an auxiliary data retrieval device.

21. A data processing system for compressing a color video segment as set forth in claim 20, and further comprising:

means for displaying the color video segment from the data string, including, a pointer into a pixel location in an $M \times N$ decompressed frame, means for retrieving the data string from the portable media through the auxiliary data retrieval device, and means responsive to retrieval of a color value in the data string placing the color value into a pixel location of the decompressed frame at a pixel location indicated by the pointer, means for repositioning the pointer by one pixel location upon placement of the color value; and means responsive to retrieval of decompression control information for positioning the pointer to a new pixel location specified by the decompression control value.

22. A data processing system for compressing a color video segment as set forth in claim 19, wherein the non-linear luminance function is of the form $$L(Y) = Y_{min} + [P(Y_{max} - Y_{min} + 1) - 1] \frac{\log(Y + 1) - \log(Y_{min} + 1)}{\log(Y_{max} + 1) - \log(Y_{min} + 1)}$$

where P is user selected parameter, $Y_{max}$ is a maximum luminance exhibited by any pixel in the first and second frames and where $Y_{min}$ is a minimum luminance exhibited by any pixel in the first and second frames.

23. A data processing system for compressing a color video segment as set forth in claim 22, and further comprising:

means responsive to user selection of a value S for skipping the S lowest luminance values in evaluating the luminance function; and means for comparing pixel locations with a luminance value among the S lowest luminance values by direct comparison of the luminance values.

24. A data processing system for compressing a color video segment as set forth in claim 22, wherein the means for determining parameters for the non-linear luminance function further includes means for determining a luminance values range for first and second frames in the sequence.

25. A data processing system for compressing a color video segment as set forth in claim 24, wherein the means for determining a luminance values range includes:

means for accumulating a histogram of luminance values across the pixels in the first and second frames;

means responsive to $Y_{min}$ corresponding to a zero luminance level and the distribution of the histogram being discontinuous between zero intensity and a next lowest intensity level having pixels for setting $Y_{min}$ equal to the next lowest intensity level.

26. A data processing system for compressing a color video segment as set forth by claim 19, wherein the means for comparing the first and second frames by comparing luminance values at corresponding pixel locations comprises:

means for subtracting the luminance values for the pixels at a corresponding pixel location to generate a difference value;

means for convening the difference value to an absolute value; and means for comparing the absolute value against a threshold.

27. A data processing system for compressing a color video segment as set forth in claim 26, and further comprising:

means responsive to luminance values at a corresponding pixel location in the first and second frames varying by less than the threshold for verifying that no change in quantized color components of the pixel of the second frame occurred by determining if any pair of quantized color components in the pixel varied oppositely from a corresponding pair of color components for the pixel in the first frame; and means responsive to luminance values at a corresponding pixel location in the first and second frames varying by more than the threshold for determining that no change occurred in a quantized color value for the pixel of the second frame.

28. A data processing system for compressing a color video segment as set forth in claim 26, and further comprising:

means for filtering the M×N difference map to remove isolated marks of changed and unchanged pixels.

29. A data processing system for compressing a color video segment as specified by claim 28, wherein the means for filtering includes:

means for remarking a pixel location unchanged where the pixel location in the M×N difference map was marked as changed and all adjacent pixel locations in the M×N difference map are marked unchanged; and means responsive to completion of remarking of pixel locations as unchanged in the M×N difference map for remarking a pixel location changed where the pixel location in the M×N difference map was marked unchanged and the adjacent pixel locations in the row of the pixel location are marked changed.

30. A data processing system for compressing a color video segment as set forth in claim 26, and further comprising:

means for detecting connected regions of changed pixels in the second frame;

means for determining border pixels of the connected regions; and means for smoothing color values for the border pixels by adjusting the color values as a function of the color values for adjacent or nearby pixel locations.

31. A data processing system for compressing a color video segment as set forth in claim 30, and further comprising:

means responsive to detection of a connected region for selecting a large value for the threshold initially and progressively reducing the value of the threshold with subsequent frames.

* * * * *